Patented Jan. 22, 1929.

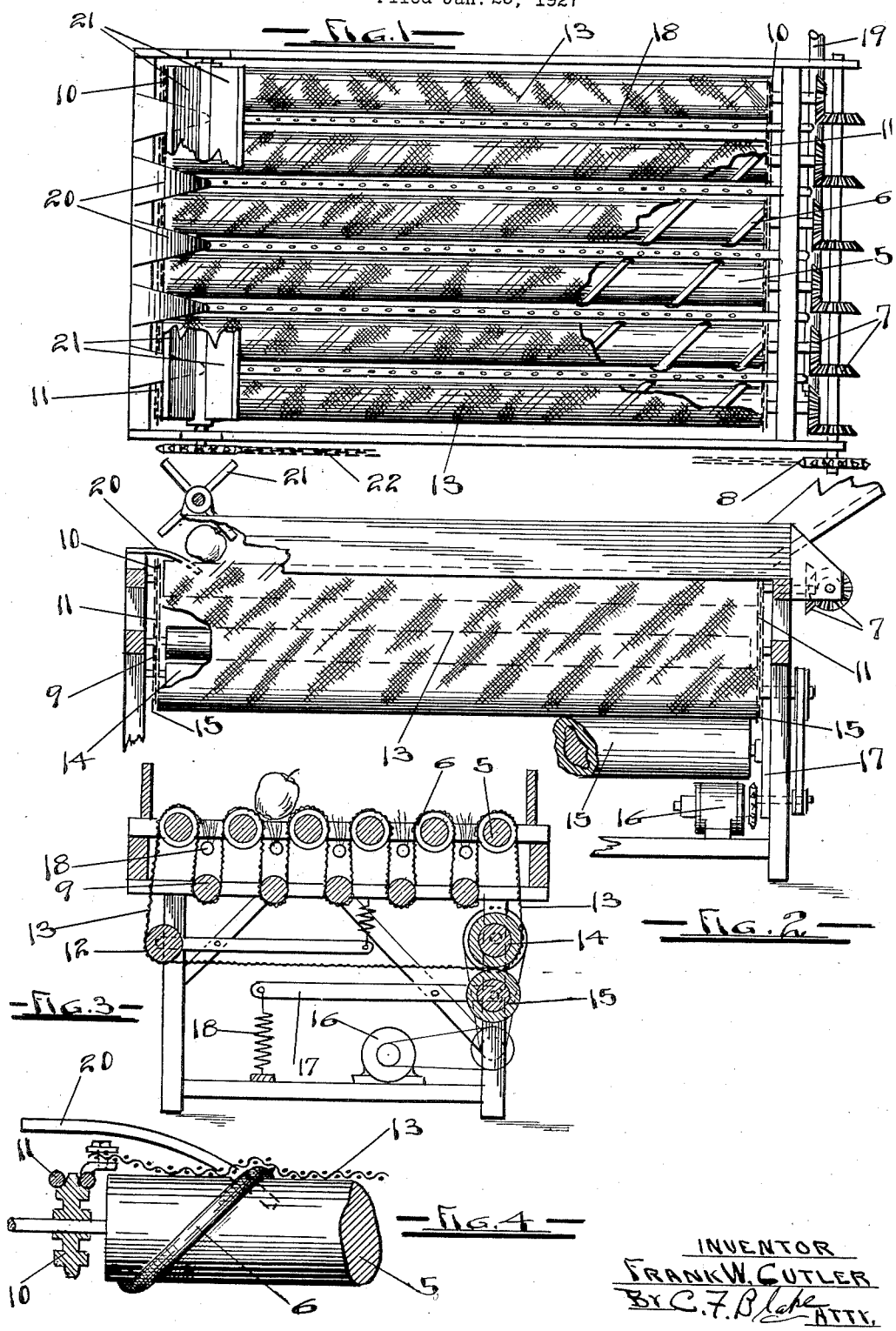

1,699,880

UNITED STATES PATENT OFFICE.

FRANK W. CUTLER, OF PORTLAND, OREGON, ASSIGNOR TO CUTLER MANUFACTURING COMPANY, OF PORTLAND, OREGON, A PARTNERSHIP.

DRIER.

Application filed January 25, 1927. Serial No. 163,529.

My invention relates to driers in general, and particularly to fruit driers, the object being to provide a device that will receive the fruit after it is washed and dry the same while conveying it onward for further manipulation such as sorting or packing. I accomplish this object by means of the construction illustrated in the accompanying drawing, which is a part of this application for Letters Patent, like characters of reference indicating like parts throughout the several views thereof, and in which:

Fig. 1 is a plan view of my device, with some parts broken away.

Fig. 2 is a side elevation of the same, also with parts broken away.

Fig. 3 is a transverse section of the device.

Fig. 4 is an enlarged detail of one of the rollers and the fabric apron.

In general my device consists of a conveyor and an endless apron of fabric material passing over members of said conveyor, means for moving said apron, and a wringer for drying the apron.

The preferred form of conveyor is the spiral roller type in wide use upon fruit sorting machines. It consists of a plurality of parallel rollers 5 spirally wound with cord 6, mounted in a suitable frame and operated by suitable gears, such as bevel gears 7, which in turn may be operated by a sprocket and chain 8 from any convenient source of power, the source not being shown in the drawings.

Below the rollers 5 and parallel thereto are a series of rollers 9, one of said rollers 9 being positioned immediately beneath the space between each of the rollers 5, as shown in Fig. 3. At each end of the rollers 5 and 9, and freely mounted upon the shafts which support the same, are chain sprockets 10 which support an endless chain 11. Said chain runs alternately over the sprockets respective to the rollers 5 and beneath those respective to rollers 9, as shown in Fig. 3, and from the outer of the rollers 5 it passes downward around a wringer device hereinafter to be described and a tightener 12, as shown in Fig. 3. Mounted upon these two chains and positioned therebetween is a drying fabric 13 which travels with the chains. This fabric apron is allowed considerable slack between the chains so that the spiral cords 6 will raise the apron as it passes over the rollers 5 and thereby have a longitudinal conveying effect upon the fruit.

Beneath the rollers 9 is disposed a wringer consisting of rubber covered rollers. The upper roller 14 is provided at each end with chain sprockets 15 by which the chains 11 are operated. This roller is operated by any convenient mechanism, that shown being an electric motor 16 with chain gears and belts connecting it with the roller 14. The second wringer roller 15 is mounted beneath the roller 14 and is held in contact therewith by equalizers 17, a spring 18 providing the necessary pressure between the wringer rollers. The fabric apron passes between these wringer rollers and is thereby sufficiently dried to be again presented to the wet fruit.

To dislodge any deposit of moisture within the stem and calyx ends of the fruit as it passes along over the apron I provide pipes 18' between each of the rollers 5 and beneath the upper surface thereof, which pipes are connected with a manifold 19 through which hot air is delivered into the pipes 18 to be contacted with the fruit by means of jets issuing from orifices in the pipes, as shown in Fig. 3, thus removing any moisture in the stems and calyx ends to the surface of the fruit exposed to the apron 13, whereby it is removed from the fruit.

To remove the fruit at the end of the conveyor from its position between the rollers 5 I provide downwardly curved fingers 20 secured upon the frame and extending into the spaces between said rollers. To assist the passage of the fruit upward upon the fingers I provide a paddle wheel mounted to rotate transversely of the device at the end thereof adjacent the fingers 20. The blades 21 of said paddle wheel are preferably constructed of yieldable material such as rubber, canvas or leather, or the like, and they contact with the fruit as shown in Fig. 2 to assist it upon the fingers 20. Said paddle wheel is operated conveniently by a chain and sprocket 22 connected to any convenient source of power, that, for example, which drives the rollers 5.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. In a drier: a plurality of conveyor rolls; an apron of fabric material moving over said rolls; and members moving in the same direction as said rolls and upon which members said apron is mounted.

2. In a drier: a plurality of conveyor rolls; a plurality of rolls beneath said conveyor rolls and parallel thereto; an apron of fabric material moving over said conveyor rolls and beneath said latter rolls; and means to move said apron.

3. In a drier: a plurality of conveyor rolls; a plurality of rolls beneath said conveyor rolls and parallel therewith; an apron of fabric material moving over said conveyor rolls and beneath said latter rolls; and endless flexible members at each end of said rolls traveling in the same direction as the rolls and upon which said apron is mounted.

4. In a drier: a plurality of conveyor rolls; a plurality of rolls beneath said conveyor rolls and parallel therewith; an apron of fabric material moving over said conveyor rolls and beneath said latter rolls; endless flexible members at each end of said rolls traveling in the same direction as the rolls and upon which said apron is mounted; and wringer rolls to receive said apron therebetween and dry the same as it travels.

5. In a drier: a plurality of conveyor rolls; a plurality of rolls beneath said conveyor rolls and parallel thereto; an endless fabric apron moving over said conveyor rolls and beneath said latter rolls; and fingers at the discharge ends of said conveyor rolls extending between adjacent rolls to lift material from said apron.

6. In a drier: a plurality of conveyor rolls; a plurality of rolls beneath said conveyor rolls and parallel thereto; an endless fabric apron moving over said conveyor rolls and beneath said latter rolls; fingers at the discharge ends of said conveyor rolls extending between adjacent rolls to lift material from said apron; and a paddle wheel above said fingers to move material thereupon.

7. In a drier: a plurality of conveyor rolls; a plurality of rolls beneath said conveyor rolls and parallel thereto; an endless fabric apron moving above said conveyor rolls and beneath said latter rolls; and orificed pipes above said latter rolls adapted to receive hot air and deliver the air in jets upwardly between said conveyor rolls to impinge upon material thereupon.

8. In a drier: conveyor rolls to receive fruit; a traveling fabric apron disposed between the fruit and said rolls; and means to move said apron independently of said rolls.

9. In a drier: conveyor rolls to receive fruit; a traveling fabric apron disposed between the fruit and said rolls; means to move said apron independently of said rolls; and wringer rolls to receive said apron therebetween and dry the same as it travels.

10. In a drier: conveyor rolls to receive fruit; a traveling fabric apron disposed between the fruit and said rolls; means to move said apron independently of said rolls; and orificed pipes to convey hot air and impinge the air upon the fruit in jets.

11. In a drier: conveyor rolls to receive fruit; a traveling fabric apron disposed between the fruit and said rolls; means to move said apron independently of said rolls; means to remove accumulated moisture from indentations upon the fruit and deposit it upon said apron; and means to dry said apron as it travels.

In witness whereof I claim the foregoing as my own I hereunto affix my signature at Portland, county of Multnomah, State of Oregon, this 31st day of Dec., 1926.

FRANK W. CUTLER.